United States Patent [19]

Inokuchi

[11] Patent Number: 4,468,094
[45] Date of Patent: Aug. 28, 1984

[54] DACH MIRROR ARRAY

[75] Inventor: Toshiyuki Inokuchi, Yokohama, Japan

[73] Assignee: Ricoh Company, Ltd., Tokyo, Japan

[21] Appl. No.: 407,949

[22] Filed: Aug. 13, 1982

[30] Foreign Application Priority Data

Aug. 17, 1981 [JP] Japan ................................ 56-128621

[51] Int. Cl.³ .......................... G02B 5/08; G02B 5/10;
G02B 5/124; G02B 5/136
[52] U.S. Cl. ................................... 350/299; 350/103;
350/109; 350/310
[58] Field of Search ............... 350/299, 310, 512, 527,
350/557, 569, 446, 103, 109

[56] References Cited

FOREIGN PATENT DOCUMENTS 3106539 1/1982 Fed. Rep. of Germany .

Primary Examiner—John K. Corbin
Assistant Examiner—Richard F. Gallivan
Attorney, Agent, or Firm—Oblon, Fisher, Spivak, McClelland & Maier

[57] ABSTRACT

A roof mirror array for use in an optical imaging apparatus includes a front and a rear surface on which a succession of chevron faces of an equal configuration are formed in a manner such that the peak of one of the surfaces is aligned with the valley of the other surface. The chevron faces on at least one of the front and the rear surface define a roof mirror surface. The array includes a holding frame which surrounds the outside portion of the central region between the chevron faces.

6 Claims, 12 Drawing Figures

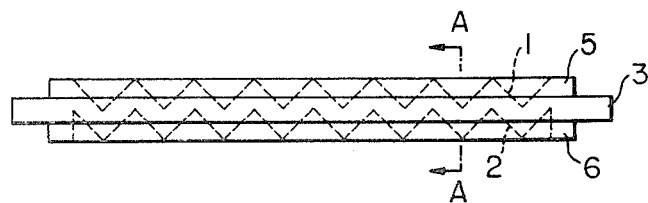
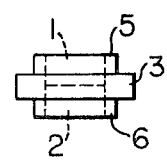
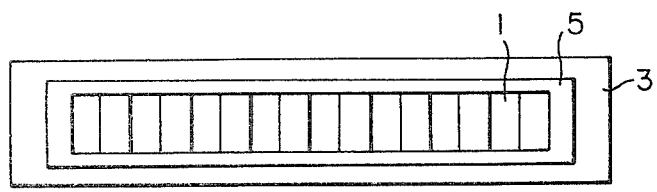
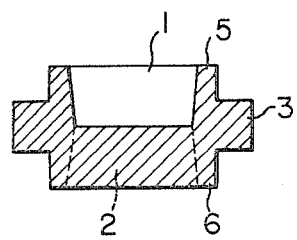
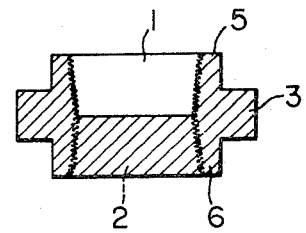

DACH MIRROR ARRAY

BACKGROUND OF THE INVENTION

1. Field of the Invention

This invention relates to a roof mirror array for use in an optical imaging apparatus.

2. Description of the Prior Art

A roof mirror array comprises a plurality of roof-shaped right angle mirrors disposed in juxtaposed succession, and may be used in an imaging apparatus as disclosed in Japanese Patent Application No. 112,491/1980, for example, filed by the common asignee as the present application. This imaging apparatus comprises a micro-lens array, a micro-roof mirror array disposed rearwardly of the micro-lens array so that the individual lenses and mirrors are in alignment with each other, and a light path splitting right angle mirror of an increased length which is disposed forwardly of the micro-lens array. Light reflected from an object surface is initially reflected by one of the reflecting surfaces of the right angle mirror to pass through the micro-lens for reflection by the micro-roof mirror to be redirected through the micro-lens for the second time and to be projected onto an imaging surface by the other reflecting surface of the right-angle mirror. Such an arrangement provides a compact imaging apparatus having a reduced focal length.

A roof mirror array is generally molded from a plastic material and is formed with a succession of chevron faces having an opening angle of 90° on its front surface, which provides a roof mirror surface. Another succession of chevron faces are formed on the rear surface in a manner such that the peak of one of the front and the rear surface is aligned with the valley of the other surface. A holding frame is disposed in surrounding relationship with the chevron faces on the rear side. The purpose of forming chevron faces on both surfaces is to provide an equal thickness between both of the surfaces in order to prevent the occurrence of shrinkage accompanied by minute pitting during the molding operation. However, while this may prevent a shrinkage and pitting of the roof mirror surface, warpage occurs in a direction perpendicular to the direction of the array as a result of shrinkage during the plastic molding operation, resulting in an opening angle of the individual roof mirror surfaces which is $90° - \Delta\theta$, thus preventing an intended optical response from being obtained. In addition, when mounting the holding frame, if a reference surface of the holding frame is maintained in abutment against a holding member, nonuniform stresses may be applied to the roof mirror surface, causing a distortion thereof or a deviation from the right angle.

Referring to FIGS. 1 to 3, a conventional arrangement will now be described. A conventional roof mirror array 10 comprises a front surface which defines a roof mirror surface formed by a succession of chevron faces 1 having an opening angle of 90°, a rear surface formed by another succession of chevron faces 2 or an equal configuration as the chevron faces 1 on the front surface and arranged so that the peak of one of the surfaces is aligned with the valley of the other surface, and a holding frame 3 disposed in surrounding relationship with the exterior of the chevron faces 2 which define the rear surface. The array 1 is integrally formed as by injection molding of a plastics material. The purpose of providing chevron faces on both surfaces of the roof mirror array 10 is to provide an equal thickness between the surfaces so as to prevent a shrinkage accompanied by minute shrinkage during the molding operation. However, while such arrangement effectively prevents a "shrinkage and pitting" of the roof mirror surfaces 1, 2, the shrinkage during the plastics molding operation causes a warpage to occur in the Y-direction which is perpendicular to the array direction X, as shown in FIG. 3, changing the opening angle of the individual roof mirror surfaces to a value $90° - Wr$. This prevents an intended optical response from being achieved. In addition, when mounting the molding frame 3, if a reference surface 4 of the frame 3 is held in abutment against a holding member, nonuniform stresses may be applied to the roof mirror surfaces so as to cause a distortion thereof or a deviation from the right angle.

SUMMARY OF THE INVENTION

It is an object of the invention to provide a roof mirror array which can be formed by a plastic molding operation in which the configuration of the roof mirror array minimizes warpage or an angular error during the molding operation.

According to the invention, the roof mirror array comprises a front and a rear surface on which a succession of chevron faces of an equal configuration are formed in a manner such that the peak of one of the surfaces is aligned with the valley of the other surface, with at least one of the surfaces defining a roof mirror surface, and a holding frame which surrounds the exterior of the central region between both chevron faces.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 8 is a frontal view of a roof mirror array according to a further embodiment of the invention.

FIG. 9 is a side elevation view of the roof mirror array shown in FIG. 8.

FIG. 10 is a plan view of the roof mirror array shown in FIG. 8.

FIGS. 11 and 12 are enlarged cross sections of modifications of the arrangement shown in FIG. 8, as taken along the line A—A shown in FIG. 8.

DETAILED DESCRIPTION OF THE PREFERRED EMBODIMENTS

Figure 1:
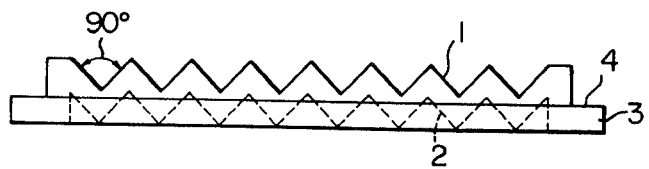
FIG. 1 is a front view of one exemplary roof mirror array of the prior art.
Figure 2:
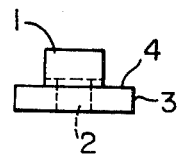
FIG. 2 is a side elevation view of the roof mirror array shown in FIG. 1.
Figure 3:
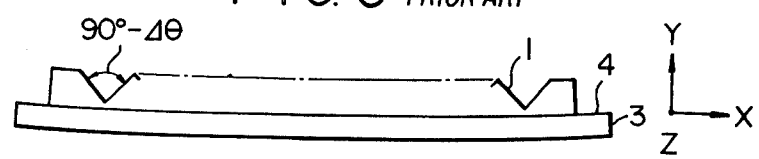
FIG. 3 is a schematic illustration of a warpage occurring in the roof mirror array shown in FIG. 1.

The invention will now be described in connection with the preferred embodiments thereof. For the convenience of description, parts similar to those shown in FIG. 1 are designated by like reference numerals. In a first embodiment of the invention shown in FIGS. 4 and 5, both the chevron faces 1 which define a roof mirror surface and chevron faces 2 which do not define a roof mirror surface have their valleys partly covered by a holding frame 3 which is disposed in surrounding relationship with the exterior of the central region between both faces. Such an arrangement is employed when the thickness of the chevron-shaped region is relatively low, and is particularly advantageous in preventing "shrinkage and pitting" when the roof mirror surface is to be formed by the injection molding.

Figure 6:
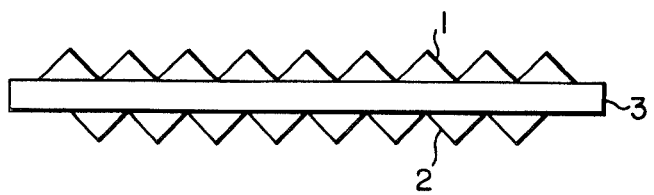
FIG. 6 is a frontal view of a roof mirror array according to another embodiment of the invention.
Figure 7:
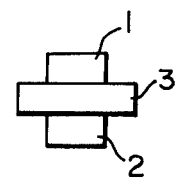
FIG. 7 is a side elevation view of the roof mirror array shown in FIG. 6.

Another embodiment of the invention shown in FIGS. 6 and 7 is employed when the thickness of the chevron region is relatively high, and the holding frame 3 just extends between the valleys of the roof mirror surface 1 and the chevron faces 2. This arrangement is advantageous to the transfer of a satisfactory roof mirror surface when the roof mirror array is to be formed by an injection compression molding.

Figure 4:
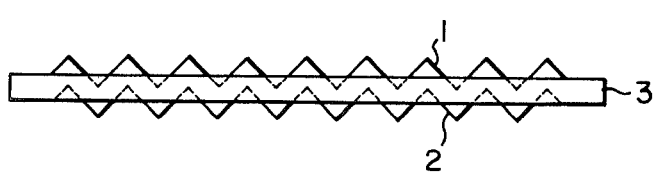
FIG. 4 is a frontal view of a roof mirror array according to one embodiment of the invention.
Figure 5:
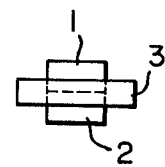
FIG. 5 is a side elevation view of the roof mirror array shown in FIG. 4.

By disposing the holding frame around the central region between the opposite chevron faces, the stresses which are produced upon shrinkage during the molding operation can be made uniform, and the occurrence of a warpage which results from the shrinkage of plastics can be prevented. The holding frame 3 may also surround part of the valleys of the chevron faces 1, 2, as illustrated in FIG. 4, so as to be effective in securing the right angle relationship of the roof mirror surface, thus advantageously preventing the warpage in the Y-direction and compensating for any deviation from the right angle relationship of the individual roof mirror faces.

A further embodiment of the invention shown in FIGS. 8 and 9 illustrates a furtherance of this concept. In this embodiment, the holding frame 3 is provided with flanges 5, 6, which entirely surround the chevron faces 1, 2. FIG. 10 is a plan view of the arrangement shown in FIG. 8. In addition to the effects mentioned above, this arrangement allows the flanges themselves to effectively prevent warpage in the array and to distribute the pressures produced when mounting the array on a holding member thus advantageously preventing undue stresses from being applied to the array and also preventing the occurrence of a distortion, deviation from the right angle or a warpage in the roof mirror surface.

When the holding frame 3 is provided with these flanges 5, 6, it is desirable that the lateral end faces of the chevron faces 1, 2 be tapered or inclined so that their upper or lower end extends slightly toward one another, as shown in FIG. 11. Such tapering is useful in providing an inclination to facilitate the release from mold and in allowing removal of a mask which is used when applying a reflecting film to the roof mirror surface. As shown in FIG. 12, the inclined surface may be shaped as minute irregularities in the surface, which is useful in eliminating flares in practical use.

As discussed above, the invention allows the disadvantage of a plastic molding material to be compensated for and enables the individual roof mirror reflecting faces to exhibit a favorable optical response. Since the front and the rear surfaces are constructed with a substantially identical configuration in accordance with the invention, either surface may be used as a roof mirror surface provided sufficient accuracy is maintained.

It will be readily understood by those skilled in the art that the invention is not limited to specific embodiments shown and described above, but that a variety of modifications can be made therein without departing from the spirit and the scope of the invention.

What is claimed as new and desired to be secured by Letters Patent of the United States is:

1. A roof mirror array comprising;
   a front and a rear surface on which a plurality of chevron faces of an equal configuration are formed so that a peak portion on a first surface of each of said chevron faces is aligned with a valley portion on a second surface of each of said chevron faces, wherein at least one of the first and second surfaces further comprises a roof mirror surface; and
   a holding frame disposed so as to surround an exterior portion of a central region between each of said plurality of chevron faces.

2. A roof mirror array according to claim 1 wherein the holding frame surrounds a part of said valley portions in each of the plurality of chevron faces.

3. A roof mirror array according to claim 1 wherein the holding frame extends between said valley portion of each of the plurality of chevron faces on the second surfaces.

4. A roof mirror array according to claim 1 wherein the holding frame entirely surrounds said valley portions of each of the plurality of chevron faces.

5. A roof mirror array according to claim 4 wherein the the holding frame which surrounds said valley portions of each of the plurality of chevron faces further comprises a tapered inner wall surface.

6. A roof mirror array according to claim 5 wherein the holding frame further comprises an internal wall surface having a plurality of minute irregularities formed therein.

* * * * *